US007168001B2

(12) United States Patent
Johnson et al.

(10) Patent No.: US 7,168,001 B2
(45) Date of Patent: Jan. 23, 2007

(54) TRANSACTION PROCESSING APPARATUS AND METHOD

(75) Inventors: Charles S. Johnson, San Jose, CA (US); Shang-Sheng Tung, Cupertino, CA (US); Ronald M. Cassou, Palo Alto, CA (US); David Hege, San Jose, CA (US); Gary S. Smith, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 470 days.

(21) Appl. No.: 10/774,267

(22) Filed: Feb. 6, 2004

(65) Prior Publication Data
US 2005/0187891 A1    Aug. 25, 2005

(51) Int. Cl.
*G06F 11/00* (2006.01)
(52) U.S. Cl. .......................................... 714/13; 714/11
(58) Field of Classification Search ................. 714/13, 714/11, 12
See application file for complete search history.

(56) References Cited
U.S. PATENT DOCUMENTS

| | | | | |
|---|---|---|---|---|
| 4,590,554 | A | * | 5/1986 | Glazer et al. .................. 714/13 |
| 5,621,885 | A | * | 4/1997 | Del Vigna, Jr. ................ 714/13 |
| 5,737,514 | A | * | 4/1998 | Stiffler .......................... 714/13 |
| 6,041,420 | A | * | 3/2000 | Skarpelos et al. .............. 714/7 |
| 6,161,193 | A | * | 12/2000 | Garg et al. ...................... 714/6 |
| 6,301,676 | B1 | * | 10/2001 | Kumar et al. .................. 714/11 |
| 6,338,146 | B1 | | 1/2002 | Johnson et al. |
| 6,954,877 | B2 | * | 10/2005 | Earl et al. ..................... 714/13 |

OTHER PUBLICATIONS

U.S. Appl. No. 09/872,323, filed Jun. 1, 2001, entitled "System and Method for Replication of Distributed Databases that Span Multiple Primary Nodes".
U.S. Appl. No. 10/095,996, filed Mar. 8, 2002, entitled "Using Process Quads to Enable Continuous Services in a Cluster Environment" of Gunnar D. Tapper et al.
U.S. Appl. No. 10/435,115, filed May 9, 2003, entitled "Minimum Latency Reinsatement of Databas Transacti n Duration Locks From the Log for Fast Crash R covery of Databases" of Charles S. Johnson et al.
"Concurrency Control And Recovery In Database Systems," 1987, pp. 168-171, by Philip A. Bernstein, Vassos Hadzilacos and Nathan Goodman.

(Continued)

*Primary Examiner*—Dieu-Minh Le

(57) ABSTRACT

A method of processing a transaction includes processing a transaction workload in a primary process pair on a first node in a cluster of nodes, the processing using at least one stable storage volume for storing a database and another stable storage volume for storing a log, the at least one stable storage volume and the log storage volume forming a log storage group. The method further includes performing checkpointing operations via the network from the primary process pair to a backup process pair while processing the transaction workload, the backup process pair operating on a second node in the cluster of nodes. The method further includes detecting a failure making the first node inoperable or inaccessible, and after detecting the failure, engaging the backup process pair to take over the transaction processing workload of the primary process pair, the backup process pair being configured to operate with the log storage group used by the primary process pair on the failed node.

17 Claims, 11 Drawing Sheets

OTHER PUBLICATIONS

"Transaction Processing: Concepts And Techniques," 1993, pp. 5-22, 109-121, 562-573, by Jim Gray and Andreas Reuter.

Leslie Lamport, The Implementation of Reliable Distributed Multiprocess Systems, North-Holland Publishing Company Computer Networks 2 (1978) pp. 95-114.

Leslie Lamport, Time, Clocks and the Ordering of Events in a Distributed System, Communication of the ACM, Jul. 1978, vol. 21, No. 7, Massachusetts Computer Associates, Inc.

Robert H. Thomas, A majority Consensus Approach to Concurrently Control for Multiple Copy Databases, ACM Transaction on Database Systems, vol. 4, No. 2, Jun. 1979, pp. 180-209.

Nancy A. Lynch, Distributed Algorithms, 1996 by Morgan Kaufmann Publishers, Inc., pp. 565-689 (Chapter 17-Chapter 21).

* cited by examiner

TRANSACTION PROCESSING APPARATUS AND METHOD

BACKGROUND

Large transaction processing systems are typically distributed systems formed from a plurality of nodes interconnected by a network called an external switching fabric. One disadvantage of this type of distributed systems is that if a node becomes inoperable or inaccessible for a period of time, transactions that are processed by the node are disrupted. Inaccessibility may occur when software operating on the node undergoes a major overhaul or if there is a communication failure in the external switching fabric that isolates a node from the other nodes in the cluster. When such a failure occurs, it is desirable to make the node failure relatively unobservable to the users of the system. One existing solution, sometimes referred to as a system pair, is to provide a spare system that acts as a hot standby to the failed node. However, this is exceedingly expensive if the inoperable or inaccessible node is large.

SUMMARY

An exemplary embodiment may comprise a method of processing a transaction, including processing a transaction workload in a primary process pair on a first node in a cluster of nodes, the processing using at least one stable storage volume for storing a database and another stable storage volume for storing a log, the at least one stable storage volume and the log storage volume forming a log storage group. The method further includes performing checkpointing operations via the network from the primary process pair to a backup process pair while processing the transaction workload, the backup process pair operating on a second node in the cluster of nodes. The method further includes detecting a failure making the first node inoperable or inaccessible, and after detecting the failure, engaging the backup process pair to take over the transaction processing workload of the primary process pair, the backup process pair being configured to operate with the log storage group used by the primary process pair on the failed node.

BRIEF DESCRIPTION OF THE DRAWINGS

Illustrative embodiments are shown in the accompanying drawings, in which.

DETAILED DESCRIPTION

The following documents are hereby explicitly incorporated by reference herein for all that they contain:

U.S. Pat. No. 6,338,146, issued Jan. 8, 2002, entitled "Method and Apparatus for Fault-Tolerant, Scalable and Non-Blocking Three-Phase Flushing for Committing Database Transactions in a Cluster of Multiprocessors";

U.S. patent application Ser. No. 10/095,996, filed Mar. 8, 2002, entitled "Using Process Quads to Enable Continuous Services in a Cluster Environment";

U.S. patent application Ser. No. 10/435,115 filed May 9, 2003, entitled "Minimum Latency Reinstatement of Database Transaction Duration Locks From the Log For Fast Crash Recovery of Databases"; and U.S. patent application Ser. No. 09/872,323, filed Jun. 01, 2001, entitled "System and Method for Replication of Distributed Databases that Span Multiple Primary Nodes".

Figure 1:
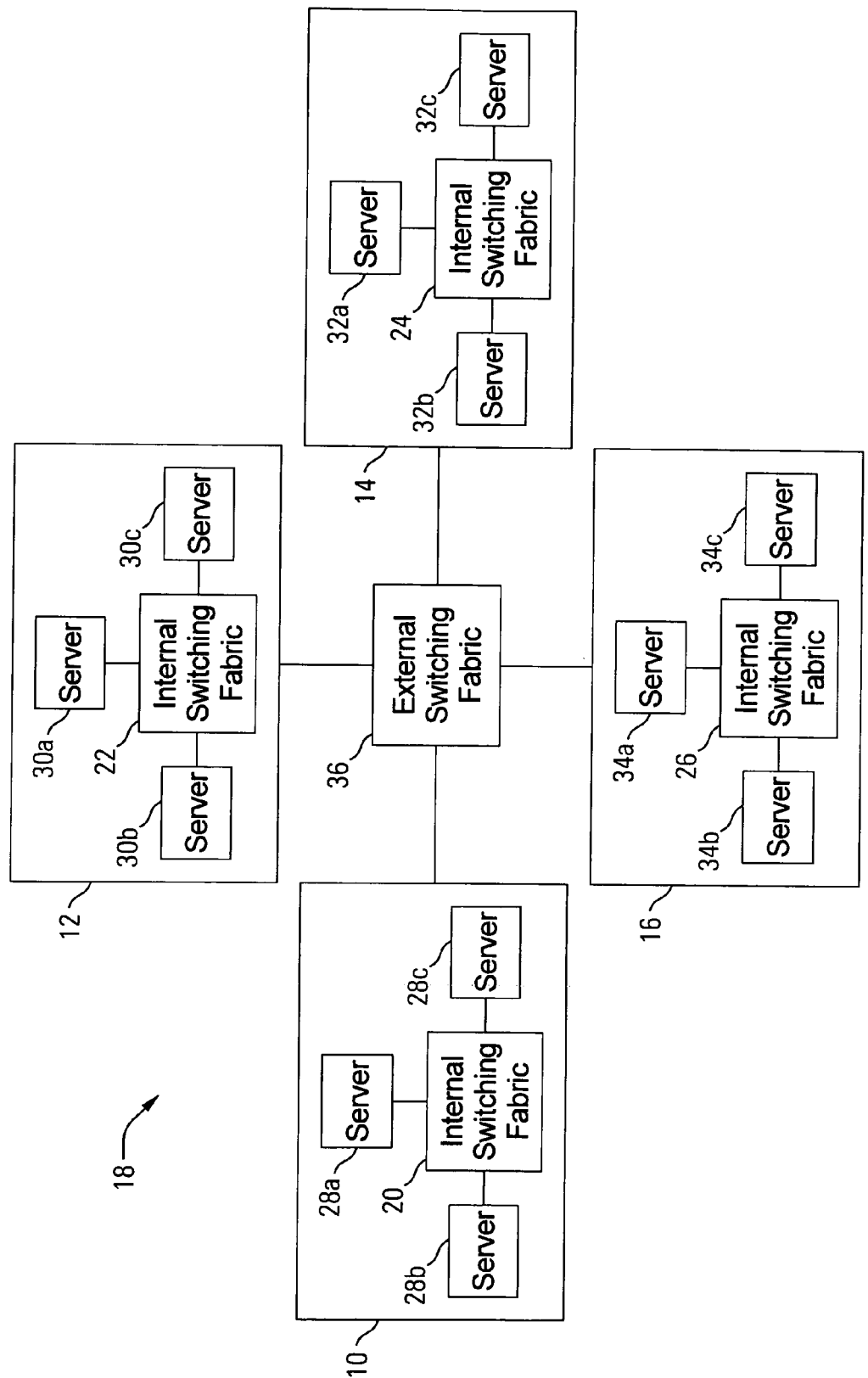
FIG. 1 is an exemplary plurality of nodes (i.e., a cluster)

FIG. 1 illustrates an exemplary transaction processing system having a plurality of nodes 10, 12, 14, 16, also referred to as a cluster 18. Nodes 10–16 each include multiple servers interconnected by an internal switching fabric 20, 22, 24, 26. Although only three servers (e.g., 28*a*–*c*) are shown per node in FIG. 1, each node of the exemplary transaction processing system may include between 2 and 16 servers. Each server 28*a*–*c*, 30*a*–*c*, 32*a*–*c*, 34*a*–*c* of a node includes a processing unit, and controllers that enable a processing unit to access stable (non-volatile) storage. Stable storage is storage that survives a failure of the processing unit. A processing unit includes a central processor and memory, each independent of the other processing units, such that a failure of one processing unit does not cause a failure of another processing unit. The memory of each processing unit is dedicated to the central processor of the processing unit. That is, the memory is not shared by other processing units.

Figure 2:
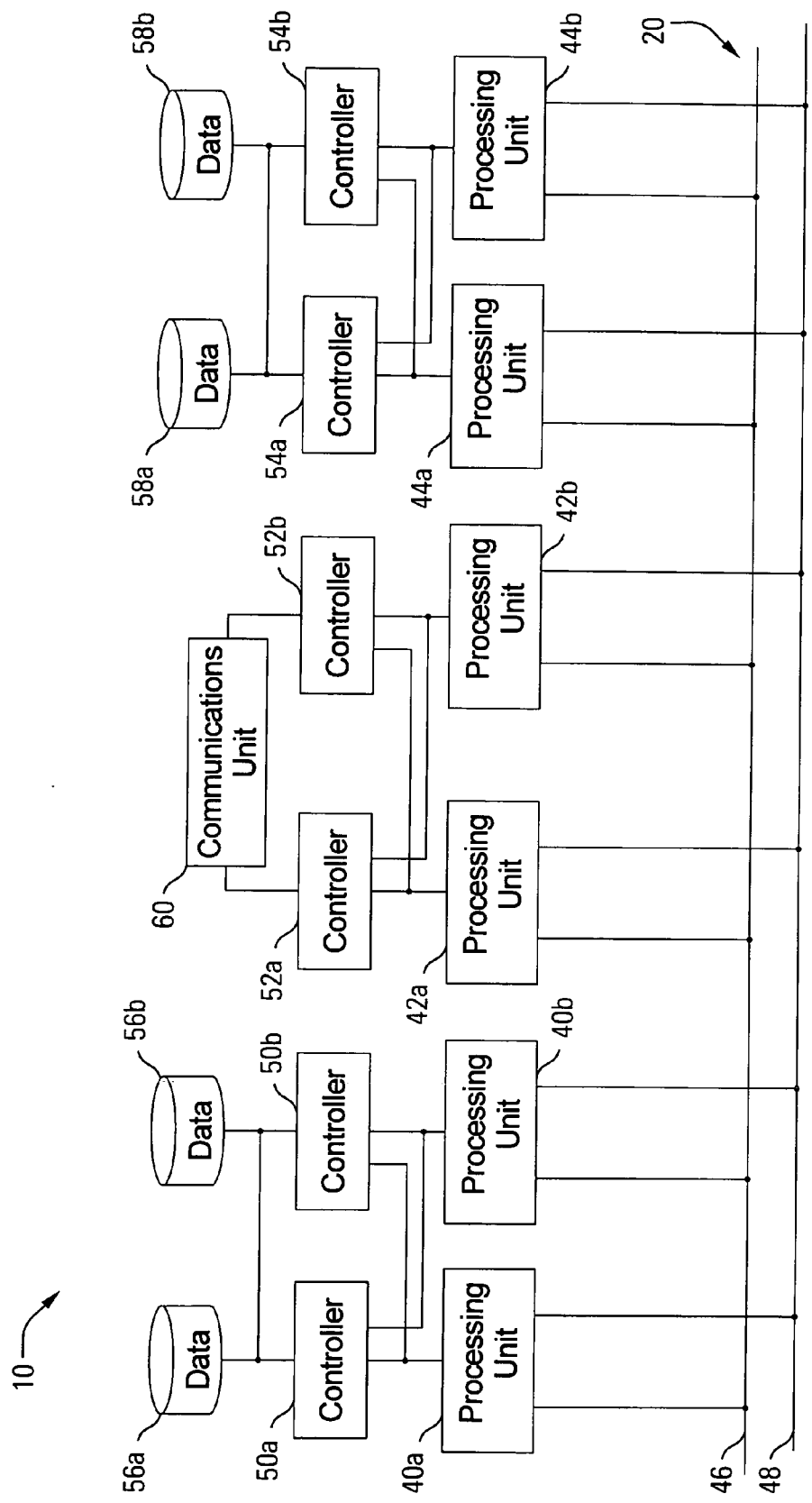
FIG. 2 is a block diagram of an exemplary node.

FIG. 2 is a block diagram of an exemplary node (e.g., 10) with six processing units 40*a*–*b*, 42*a*–*b*, 44*a*–*b*, each of which correspond to one server such as those (e.g., 28*a*, 28*b* and 28*c*) in FIG. 1. For example, processing unit 40*a* may correspond to server 28*a*, processing unit 40*b* to server 28*b*, and processing unit 42*a* to server 28*c*, etc. (Note that although only three servers (e.g., 28*a*–*c*) per node (e.g., 10) are shown in FIG. 1, the block diagram of FIG. 2 shows six processing units.) Each processing unit is connected to a pair of inter-processor buses 46, 48 that constitute the internal switching fabric (e.g., 20) of the node (e.g., 10), though other numbers of processing units and other types and numbers of buses are possible. Each processing unit pair 40*a*–*b*, 42*a*–*b*, 44*a*–*b* is connected to a corresponding controller pair 50*a*–*b*, 52*a*–*b*, 54*a*–*b* to provide redundant access to the device controlled by the controller. In some embodiments referred to as "pair-and-spare", additional backup processing units are provided in a node, all providing redundant access to the device controlled by the controller. Controller pair 50*a*–*b* is connected to storage volumes 56*a*–*b* and controller pair 54*a*–*b* is connected to storage volumes 58*a*–*b*, while controller pair 52*a*–*b* is connected to a communications unit 60. Storage volumes 56*a*–*b*, 58*a*–*b* are not required to be physically present in the node. In some embodiments, the storage volumes are part of a large storage system to which each of the processing units has access.

The drawings and description, in general, disclose a method and apparatus for providing and maintaining a fault-tolerant cluster of computing nodes used in a transaction processing system. If a node (e.g., 16, FIG. 1) in the cluster 18 fails, the remaining operational nodes (e.g., 10, 12, and 14) take over for the failed node (e.g., 16) so that transactions are not disrupted. Before describing the fault-tolerance of the cluster, an exemplary embodiment of a transaction processing system which may be implemented using a fault-tolerant cluster will be described. The composition and configuration of clusters, nodes, servers, processing units, etc., are not limited to the exemplary embodiments described herein, and may be adapted according to the desired architecture and other environmental factors. For example, an alternative cluster may comprise a network of nodes containing 32 servers each having 2 processing units, rather than the nodes with between 2 and 16 servers each having 1 processing unit as in the exemplary embodiment. In another exemplary alternative embodiment, multiple processing units may share a memory. The term transaction processing system refers herein to a physical network of distributed computing nodes such as servers and clients, to databases accessed by the computing nodes, to persistent programming languages used to create transaction software applications, and to the transaction applications used to process transactions on the system. Ideally, transaction applications take the following form:

```
Begin_Work( );
    Perform tasks accessing and modifying data
If (success)   Commit_Work( )
Else           Rollback_Work( )
```

The tasks in a transaction may thus be committed, or made permanent, if they can be successfully performed. If some error occurs and the tasks cannot be successfully performed, the transaction is rolled back so that the permanent databases are unchanged by the failed transaction. Transactions are therefore atomic, that is, they are either performed completely or not at all. This form of processing may be implemented at various levels and in various manners in the transaction processing system. For example, as discussed above, in one exemplary embodiment nodes are provided with processing unit pairs so that if one processing unit fails in a node, a backup is ready to continue processing in the node so that ongoing transactions may be committed or rolled back as appropriate. This provides intra-node fault tolerance. The method and apparatus for providing and maintaining a fault-tolerant cluster of computing nodes to be described below provides inter-node fault tolerance so that if a node fails, another node in the cluster is ready to continue processing to implement the atomic commit/rollback transaction processing scheme. The method and apparatus for providing and maintaining a fault-tolerant cluster of computing nodes is sometimes referred to herein as a takeover plan, because an operational node is able to take over transaction processing for a failed node.

Some elements of the exemplary transaction processing system will now be described before continuing with the description of the takeover plan. Generally, the transaction application initiates a transaction which is managed by a transaction manager. The transaction manager controls the commit and rollback of transactions and recovery functions in case of failures in the system during a transaction. The transaction application sends work requests to resource managers. A resource manager is the data, code, and processes that provide access to some shared data. Examples of a resource manager include database systems, spoolers, and window systems. When the transaction application issues a work request, the resource manager controlling access to the resources needed to perform the work sees the request and joins the transaction, informing the transaction manager that it will be participating in the transaction. The transaction application may not know what resource managers are needed to access certain resources, so the resource managers each determine this for themselves and join the transaction if they are needed. The resource manager that joined the transaction then performs the requested work, locking access to its resources and logging all changes it makes in the system. When the work has been completed, the transaction application initiates the commit phase of the transaction. When the transaction is about to commit, each resource manager that participated in the transaction is giving the opportunity to vote on whether the transaction was successfully performed. If all participating resource managers vote yes, the transaction can commit. If any vote no, the transaction is aborted and the system state is rolled back. This is referred to as a two-phase commit (2PC) protocol, because there is a voting phase, followed by an actual commit phase. When a transaction is committed, the changes in the log are made permanent. If the transaction is rolled back, the transaction manager runs backward through the log, issuing undo commands to the resource managers for each logged item of the transaction.

Note that functions and processes involved in a transaction, such as where the log is kept and what maintains it, may be grouped or configured in many different ways in the transaction processing system. For example, a scheduler may be included to schedule calls from the transaction manager to other processes, a transaction processing monitor may handle core services in the system and handle part of the voting during the commit phase, a log manager and lock manager may be provided as separate processes or may be implemented in a resource manager or other process. Therefore, it is to be understood that the processes of a transaction processing system to be described below are purely exemplary, and that these functions may be implemented in many different ways.

Having generally described an exemplary transaction processing system, the fault-tolerance of the cluster in the transaction processing system will now be described. However, it is important to note that the providing and maintaining of fault-tolerant nodes in a cluster is not limited to application in the exemplary transaction processing system described herein, but may be adapted by those skilled in the art to any distributed transaction processing system now known or that may be developed in the future.

Figure 3:
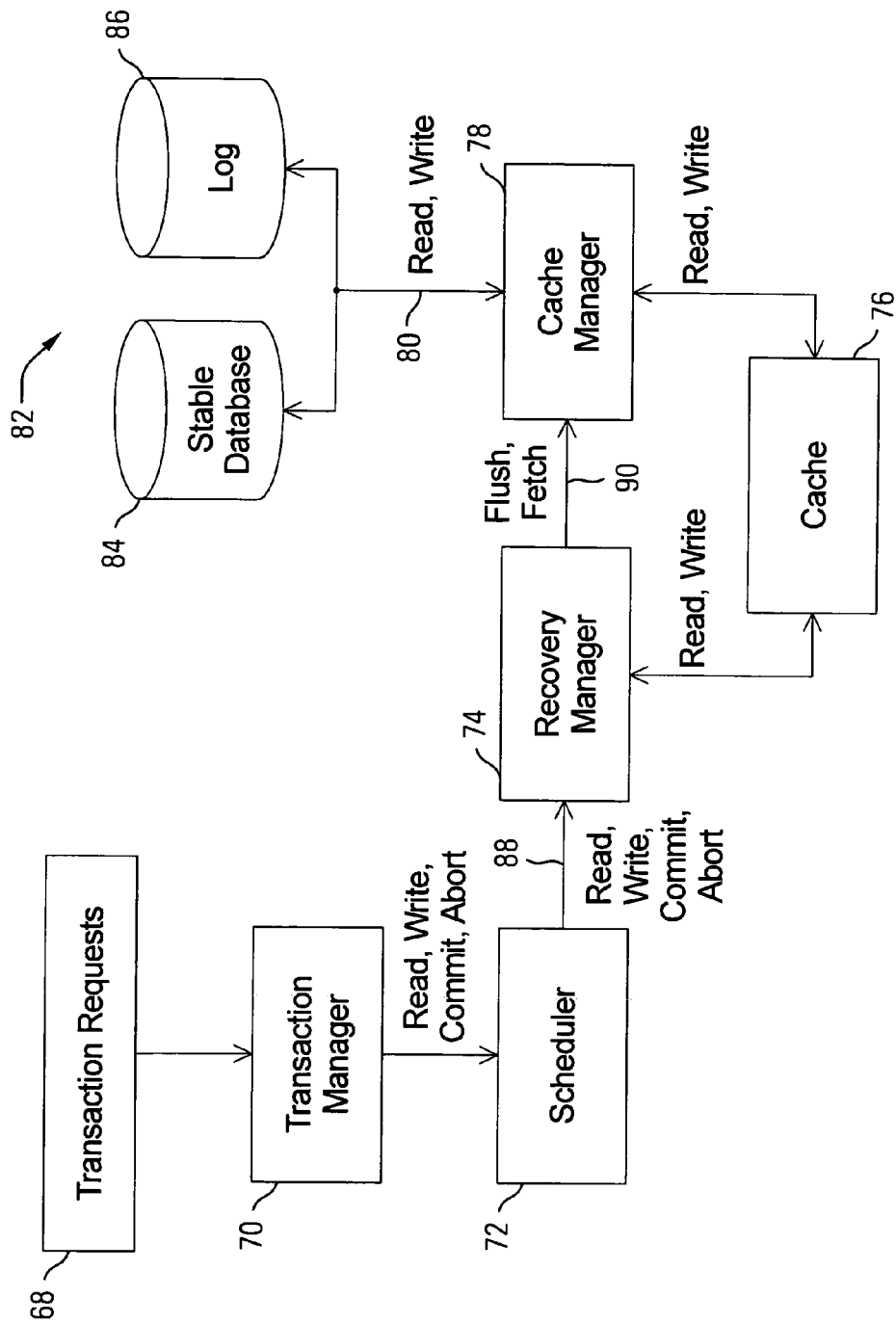
FIG. 3 is a diagram of a model of an exemplary transaction system.

Several problems that arise when a node fails in a transaction processing system may be addressed in the exemplary embodiment. One problem is that when the node fails, simply making data in the failed node's stable storage available to the other nodes (e.g., 10, 12, and 14) in the cluster 18 may not preserve the integrity of the transaction. Data in stable storage may remain available and undamaged, for example, if stored outside the failed node in network storage systems such as enterprise storage. In this case, ownership of data in stable storage may be migrated from the failed node to another node. However, it may be that data for a transaction is not all stored in stable storage while the transaction is still ongoing. In a transaction processing system, much of the data is resident in volatile storage of the server or servers processing the transaction in the failed node. To illustrate why transaction updates are not in stable storage, FIG. 3 sets forth a diagram of a model of a transaction system. This model applies, in a general way, to a node. Shown in FIG. 3 are a transaction manager 70, a scheduler 72, a recovery manager 74, cache storage 76 (also called a buffer pool) for a database, a cache manager 78, and an access point 80 to stable storage 82. (Sometimes, the scheduler 72 is considered to be included in the transaction manager 70). Stable storage 82 is usually implemented in the form of rotating magnetic disks, and volatile storage, such as the cache 76, is commonly implemented in the form of semiconductor memory. Stable storage 82 includes data in the database tables 84 and data in the log storage 86. Stable storage 82 in the exemplary embodiment comprises network storage, such as enterprise storage, so that if communication fails with a node, the stable storage 82 may be accessed by another node.

The transaction manager 70 receives transaction requests 68 from various processes in the system and decides which among the servers of the node is to process the transaction. Once decided, the transaction manager 70 forwards the transaction to the scheduler 72, which has the job of controlling the concurrent execution of a plurality of transactions which may have been submitted to the transaction manager 70. The scheduler 72 employs the recovery manager 74 to carry out the operations that make up a transaction. These operations are typically read, write, commit and abort operations 88. The recovery manager 74 receives the read, write, commit and abort requests 88 from the scheduler 72 and assumes that, because the scheduler 72 has taken care of the ordering of these operations, it can perform them in any order, though with the constraint that the operations be atomic. The cache manager 78 is configured to aid the recovery manager 74 in its tasks to perform the read, write, commit and abort operations 88. To perform these operations, the recovery manager 74 issues fetch and flush messages 90 to the cache manager 78. A fetch request causes the cache manager 78 to obtain data from the cache 76 if the data is present in the cache 76, or from stable storage 82 if the data is not present in the cache 76. If the data is fetched from stable storage 82, the data item is placed into the cache 76 for subsequent use. A flush request causes the cache manager 78 to write a data item to stable storage 82. This write is assumed to be atomic, which means that the write executes in its entirety or not at all.

Briefly, the model of FIG. 3 operates as follows. The transaction manager 70 receives a plurality of transactions for processing by the system. Each transaction usually includes a number of read and write operations on data items in the database 84. The scheduler 72 determines the order of these read and write operations for the plurality of transactions by means of a locking protocol, such as a two-phase locking protocol (2PL). The purpose of the locking protocol is to ensure a condition of serializability (and recoverability) which, in turn, is a condition for maintaining database consistency. The recovery manager 74 requests that the cache manager 78 perform the various flush and fetch operations 90 necessary to complete the scheduled reads and writes. The cache manager 78 responds to the flush and fetch requests by performing reads and writes of the cache 76 or of the stable database 84. If the data sought by the recovery manager 74 is in the cache 76, it is provided from the cache 76. If the data sought by the recovery manager 74 is not in the cache 76, it is obtained from stable storage 82 and is provided to the recovery manager 74 and to the cache 76 for subsequent reference. If the cache 76 is full, one of the occupied cache slots is chosen for replacement via a replacement algorithm such as Least Recently Used (LRU). If the chosen slot is dirty (has been written), that slot is written to stable storage 82 and is then updated with the new data. It is clear from these operations that, at any point in time, the cache 76, which resides in volatile storage, may have many dirty slots belonging to many current transactions.

Besides the replacement algorithm of the cache 76, the cache 76 has a flushing policy, by which dirty slots in the cache 76 are made persistent in stable storage 82. The most efficient flushing policy is called the "steal, no-force policy." This policy is intended to improve the speed of the transaction system by keeping data items in the cache 76 as long as possible, thereby avoiding the much slower accesses to stable storage 82. The "steal" part of the cache flushing policy means that dirty slots in the cache 76 are written to the stable database 84 only when the slot is reused, even if transactions affecting the data item in the dirty slot are still active (neither committed nor aborted). The "no-force" part of the cache flushing policy indicates that a transaction can commit without flushing to the stable database 84 any transaction updates that reside in the cache 76. Thus, while the "steal, no force" policy is efficient, it leaves some transaction updates in volatile storage and some updates in stable storage 82. If a failure occurs under these circumstances, data in volatile storage will be lost and data in stable storage 82 will be inconsistent.

To use this cache flushing policy and still maintain the recoverability of the system after a failure, a log 86 may be added to stable storage 82 and a write-ahead logging (WAL) policy may be adopted. The log 86 contains a list of data items written by transactions in the order in which the writes occurred. Under the write-ahead logging policy, updates of a data item belonging to a committed transaction are saved in the log 86 before the data item is overwritten by a transaction that is not committed. When a transaction writes a data item, the value of the item before the write is called the "before-image," and the value after the write is called the "after-image." The write-ahead logging policy preserves "before-images" in the log 86.

A transaction system may buffer or cache the write-ahead log 86 itself to speed up the write-ahead logging process. To prevent a cached write-ahead log from violating the write-ahead rule, volume sequence numbers (VSNs) are adopted for entries in the log 86 and entries in the cache 76. The VSNs enable the cache manager 78 to make sure that entries are written in the log 86 before they are flushed from the cache to the stable database 84. Thus, all "before-images" are preserved in the log 86 before the stable database 84 is overwritten, even when the log 86 is cached. Note, however, that the stable database 84 may contain data values forced there by uncommitted transactions and may be missing data values that are still in volatile storage. The exemplary takeover plan disclosed herein deals with the inconsistent state of the stable database 84.

Another problem addressed by an exemplary takeover plan for a failed node (e.g., 16) is that an operating node (e.g., 10) may have a very large transaction-processing load. In fact, the node (e.g., 10) may be running at near full capacity. Moving the entire transaction workload of the failed node (e.g., 16) to one of the nodes (e.g., 10) in the cluster 18 may not be feasible.

Yet another problem addressed by an exemplary takeover plan for a failed node (e.g., 16) is that database consistency should be preserved after the takeover. This means that, if the database, prior to the node failure, was consistent, nothing in the takeover plan makes the database inconsistent. In this context, a consistent database can be defined as one that meets some agreed upon consistency predicate. Normally, in the absence of a system failure, a database system preserves database consistency at the transaction level, which means that if a database was consistent before a transaction, it is consistent after the transaction. This level of consistency should continue after a node takeover. To preserve transaction consistency, transactions should be scheduled according to some serial order or its equivalent. As noted above, it is the job of the scheduler in a transaction processing system to preserve consistency in the execution of transactions.

A portion of a transaction processing system, such as the node described above, may fail (become inoperable or inaccessible) in a variety of ways. In particular, a system failure of a server in a node may occur, a communication failure between nodes may occur, a transaction failure or media failure may occur. Communications failures within a node are assumed not to occur in this discussion. As used herein, a system failure of a server is a failure of a central processing unit in a server, its memory, or the software executed by the processor. A media failure, such as a failure of stable storage, is distinguished from a system failure. A node failure is a complete system failure of the node or a failure of communication between the node and other nodes in the cluster such that the node is isolated from the other nodes.

For purposes of the present discussion, it is also assumed that node inoperability is always detectable and is caused by a system failure (processor-memory failure, communication failure, or software failure, etc.), as opposed to a failure of stable storage. (Failures of stable storage may be addressed using other conventional means, such as disk mirroring.)

When a failure occurs, the recovery manager 74 has the task of preserving consistency of the database during and after recovery of the system from the failure.

In the above-mentioned model, the recovery manager 74 implements both an undo and a redo policy. The undo-redo policy of the recovery manager 74 is the direct result of the "no-force, steal" cache flushing policy. The undo policy relies on "before-images" in the log 86 to backout or undo updates from transactions that are active at the time of failure. The redo policy relies on "after-images" in the log 86 to update the stable database 84 with updates for transactions that are known to be committed. The goal of recovery is to have the capability of creating a stable database 84 having only data items from committed transactions.

Figure 4:
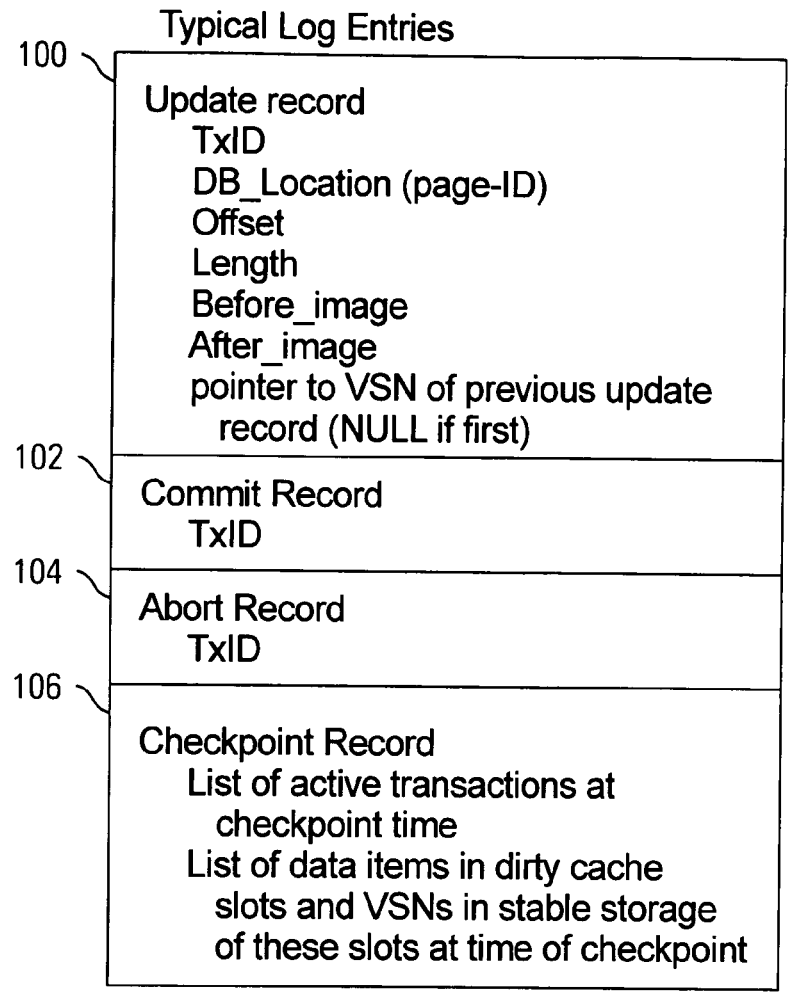
FIG. 4 is an illustration of an exemplary write-ahead log.

In an exemplary embodiment, when performing an undo or redo operation, the stopping point is noted in the log 86, prior to which the system need not concern itself. The contents of a typical log file entry are shown in FIG. 4. The log file typically includes "update" records 100, "commit" records 102, "abort" records 104, and "checkpoint" records 106, as shown. These exemplary control records are used to control processing of a transaction. Checkpointing, also referred to as control-point processing, involves periodically writing the system state into stable storage. If a failure occurs, the log is used to reconstruct recent transaction history. With checkpointing, this reconstruction only needs to go back to the point at which the system state was written into stable storage. In other words, to reconstruct the recent transaction history, one starts with the most recent checkpoint, then uses the log entries after that checkpoint to restore the state of the system. The most recent checkpoint establishes the stopping point at which it can be guaranteed that all data items in the database 84 were written by committed transactions. Writing "checkpoint" records is the means by which this stopping point is created. In order to reduce the impact of checkpointing on performance, "fuzzy checkpointing" may be used. In this scheme, instead of flushing all dirty cache slots to stable storage 82 at a checkpoint, the system flushes dirty cache slots that have not been flushed since the previous checkpoint, thereby relying on the flushing policy of the cache 76 to do most of the flushing work between checkpoints. "Fuzzy checkpointing" requires that the recovery manager 74 go back to the penultimate checkpoint, at which point it is guaranteed that data from committed transactions have been written to the stable database 84 and data from aborted transactions have been undone.

Checkpointing may also be used to determine when a node fails. Checkpoint messages are sent to backup processes in other nodes on a regular basis. If these checkpoint messages stop arriving from a primary process, the takeover process may be implemented to migrate ownership of resources from the failed node to another.

Process Environment in the Node

Figure 5:
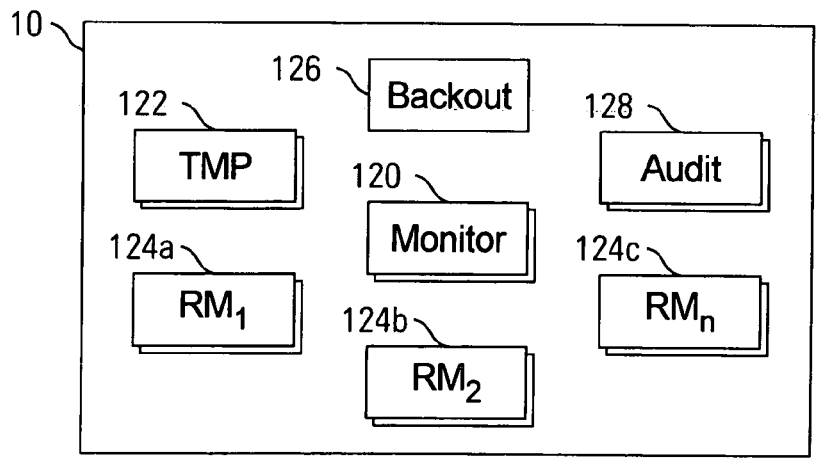
FIG. 5 is an illustration of an exemplary process environment.

FIG. 5 depicts a process environment for the node (e.g., 10). Before continuing with the description of a mechanism enabling fault-tolerance for node failures, the processes in an exemplary node in a transaction processing system will be described. These processes may be executed on computer processors in the servers (e.g., 28a–c) in the nodes (e.g., 10). As described above with respect to FIGS. 1 and 2, the exemplary node (e.g., 10) may include between 2 and 16 servers (e.g., 28a–c) or processing units (e.g., 40a–b), which are paired to facilitate fault tolerance. Therefore, the exemplary processes described below with respect to FIG. 5 occur in pairs, with one part of the process pair serving as the primary process, the other serving as the backup process, providing fault-tolerance inside a node. Those processes that occur in pairs are drawn in stacks (e.g., 122), while those that do not occur in pairs are drawn singly (e.g., 126).

The processes relevant to an exemplary embodiment include a local transaction manager, also referred to as a Local Management Process Pair or Monitor 120, a Distributed Transaction Manager Pair (TMP) 122, one or more Resource Manager (RM) Process Pairs 124a–c, a Backout Process 126, and an Audit Process Pair 128 (also known as a Log Manager). The Backout Process 126 controls the aborting of a transaction, reading the log, restoring the database to the before state, etc. The Local Management Process Pair 120 implements a two-phase commit protocol (2PC) among participants (RMs) in a local transaction. The Distributed Transaction Manager Pair 122 implements a distributed two-phase commit protocol (D2PC) among participants in a distributed (or network) transaction. The Resource Manager Process Pairs 124a–c implement the Do-Redo-Undo protocol (thus the Resource Manager Process Pairs 124a–c include a Recovery Manager, e.g., 74) for data items on a storage volume and include the scheduler (e.g., 72) which performs the locking protocol to maintain serializability. A Resource Manager Process Pair (e.g., 124a) joins a transaction when requested by a transaction client and keeps track of the 2PC phase 1 and phase 2 activities of a transaction. Both processes of the Resource Manager Process Pair (e.g., 124a) are participants in the transaction. The primary process of the Resource Manager Process Pair (e.g., 124a) performs a checkpoint operation to the backup process of the pair, so that the backup process can take over for the primary process should a system failure occur on the processing unit hosting the primary process. The checkpoint operation includes sending a current list of transactions to the backup process. The Backout Process 126 performs the undo operations if a transaction is to be aborted. The Audit Process Pair (Log Manager Pair) 128 performs the logging operation for a Resource Manager Process Pair (e.g., 124a). Both the primary Resource Manager and the backup Resource Manager of a Resource Manager Process Pair (e.g., 124*a*) send logging messages to a logging buffer managed by the Audit Process Pair 128. The Audit Process Pair 128 writes the audit log buffer to stable storage 82 when the buffer becomes full. As described above, because the audit log is buffered, volume sequence numbers (VSN) are used to help meet the undo and redo rules and to thereby insure database recovery. Because both the primary and backup Resource Managers in the Resource Manager Process Pair (e.g., 124*a*) write to the log buffer, multiple identical records may be present in the log 86.

The Resource Manager Process Pair (e.g., 124*a*) interacts with the data volume assigned to it. The data volumes for the several Resource Manager Process Pairs 124*a–c* of a node (e.g., 10) are preferably located in a storage farm called Enterprise Storage. This storage system is accessible by all of the servers (e.g., 28*a–c*, 30*a–c*, 32*a–c* and 34*a–c*) of each node 10–16 in the cluster 18. Although the storage system is physically accessible by all of the servers, only one server has ownership and complete access to the data volume. If the server fails, the backup process in another server will take over.

Process Environment in the Cluster

Figure 6:
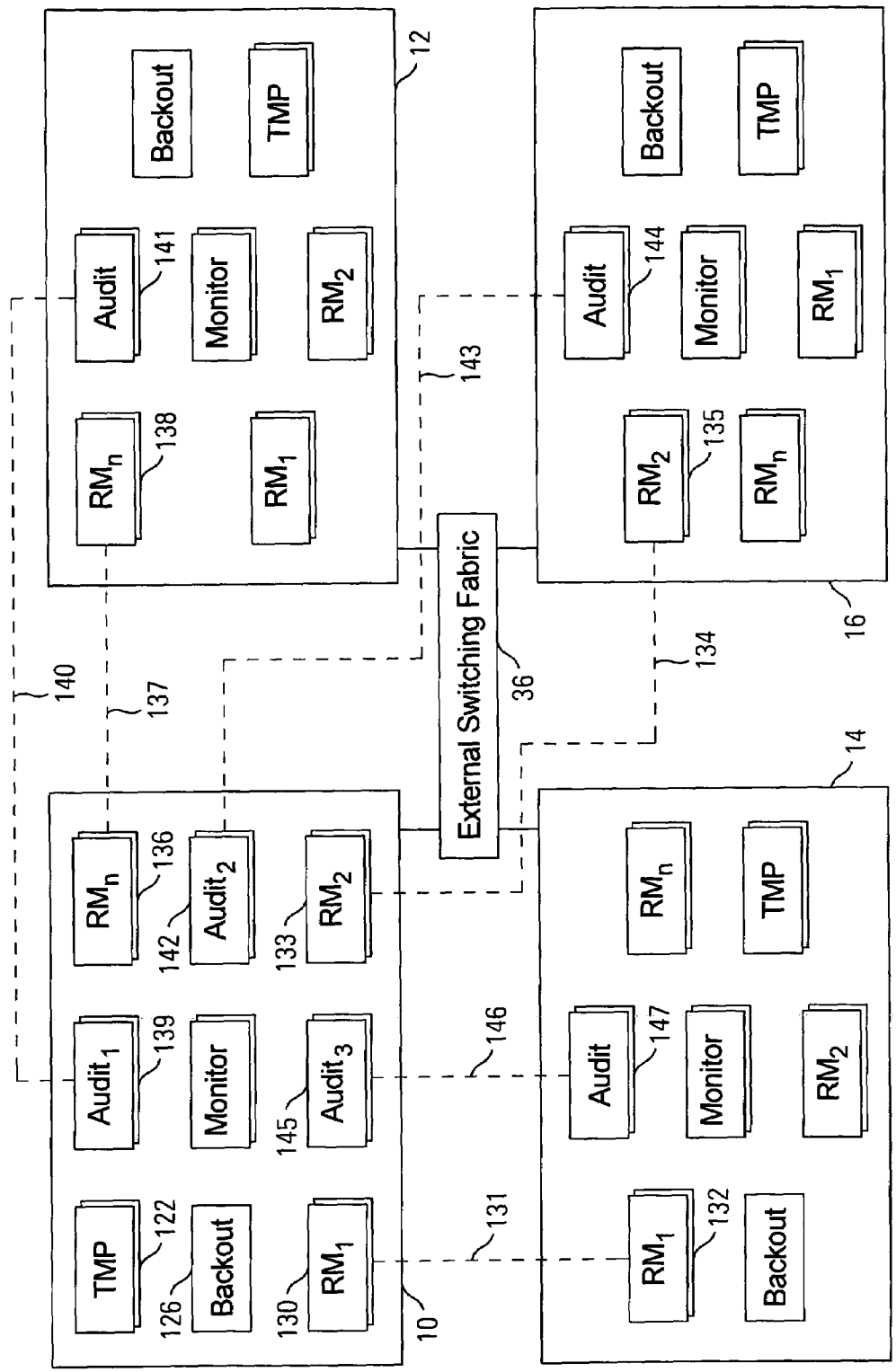
FIG. 6 illustrates exemplary changes to a process environment.

In accordance with one exemplary embodiment, the above process environment of the node (e.g., 10) is altered. FIG. 6 shows the new process environment of the node 10. First, a Resource Manager Process Pair 132 that acts as a backup to a Resource Manager Process Pair 130 in the node 10 is added to at least one of the other nodes (e.g., 14) in the cluster 18. The four Resource Managers of the two pairs 130, 132 are referred to herein as a Process Quad, consisting of a first primary, first backup, second primary and second backup. Second, the log 86 is segmented into multiple audit logs, called Auxiliary Audit Trails. An Auxiliary Audit Trail contains the updates for one or more volumes attached to the cluster 10. Additionally, a new level of checkpointing 131 occurs between the primary Resource Manager Process Pair 130 and the Backup Resource Manager Process Pair 132. This checkpointing 131 includes messages that flow from the Primary Resource Manager Process Pair 130 to the Backup Resource Manager Process Pair 132 over the external network 36 that interconnects the nodes 10, 12, 14, 16 of the cluster 18. The result is that the Backup Resource Manager Process Pair 132 has a complete state for the transactions that access the data volume of node 10, said data volume being managed by the primary Resource Manager Process Pair 130. Similarly, a pair of Resource Manager Process Pairs 133, 135 is linked via 134 between nodes 10 and 16, and a pair of Resource Manager Process Pairs 136, 138 is linked via 137 nodes 10 and 12. Thus, various Resource Manager Process Pairs (e.g., 130, 133 and 136) in a given node 10 are linked to backup Resource Manager Process Pairs (e.g., 132, 135 and 138, respectively) in a number of other nodes (e.g., 14, 16 and 12). A pair of Audit Process Pairs 139, 141 (a process quad) is linked 140 between nodes 10 and 12; a pair of Audit Process Pairs 142, 144 (a process quad) is linked 143 between nodes 10 and 16; and a pair of Audit Process Pairs 145, 147 (a process quad) is linked 146 between nodes 10 and 14. Each of these process pairs has checkpointing between the primary pair and the backup pair.

Log Storage Groups

Figure 7:
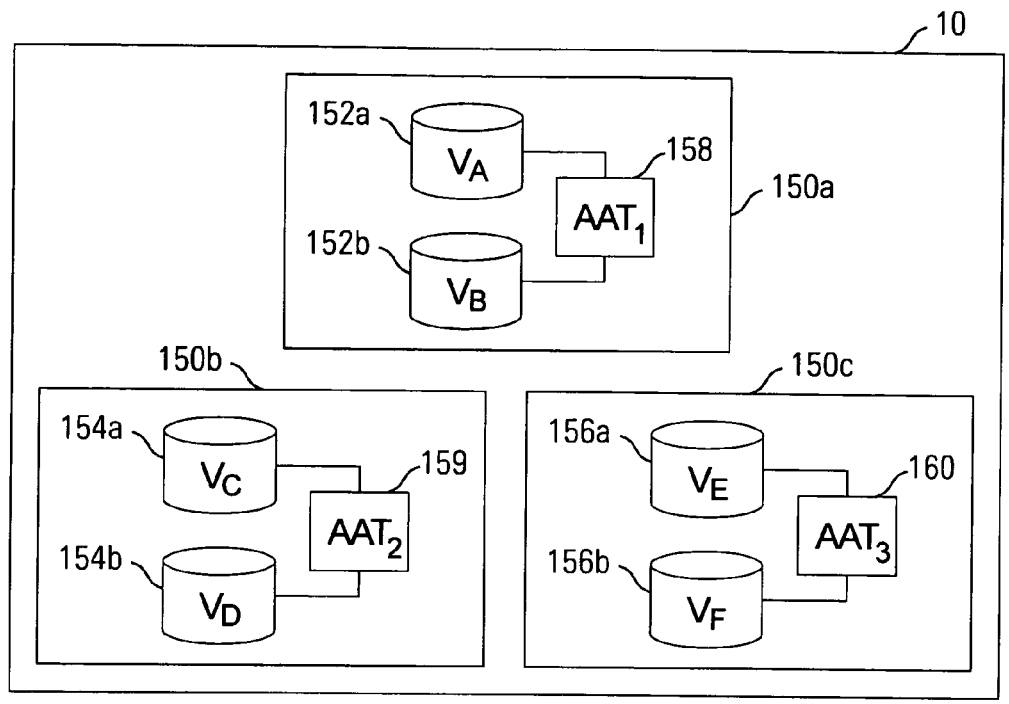
FIG. 7 illustrates an exemplary log storage group.
Figure 8:
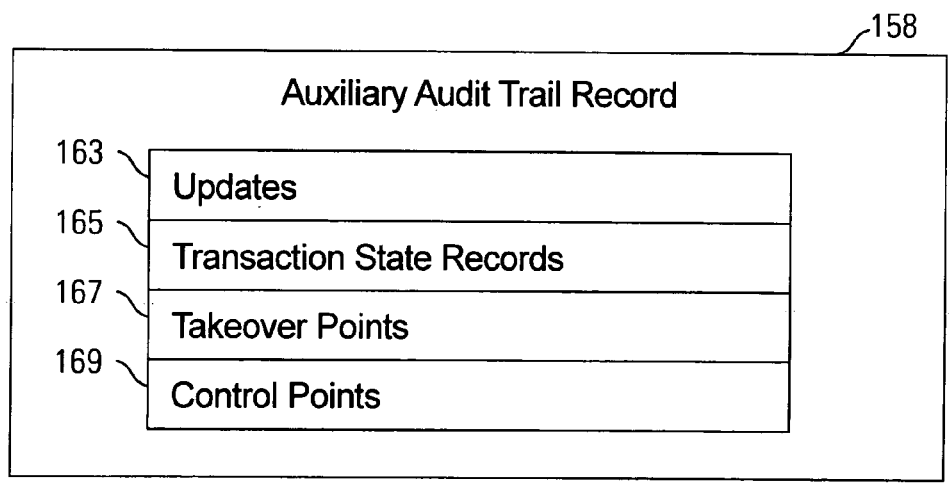
FIG. 8 illustrates an exemplary auxiliary audit trail.
Figure 9:
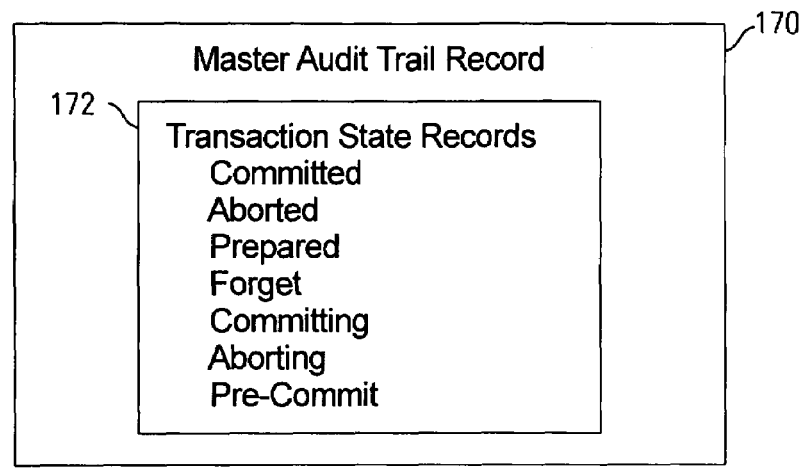
FIG. 9 illustrates an exemplary Master Audit Trail.

A new entity called a log storage group is defined for the system. FIG. 7 illustrates a Log Storage Group 150*a–c*, which includes one or more disk volumes 152*a–b*, 154*a–b*, 156*a–b*, and an Auxiliary Audit Trail (AAT) 158, 159 and 160 in which the one or more disk volumes record their log data. (For example, referring to FIG. 6, the disk volumes associated with Resource Manager pairs 130 of node 10 and 132 of node 14, and the audit trails associated with Audit Process pairs 145 of node 10 and 147 of node 14, form a log storage group.) Typical records in the Auxiliary Audit Trail (e.g., 158) are shown in FIG. 8. Entries include updates 163 to the database, transaction "state" records 165 from commit coordinators, takeover points 167 from commit coordinators, and control points 169 from the TMP (the distributed transaction manager) process, as illustrated. The disk volumes (e.g., 152*a–b*) and the Auxiliary Audit Trail (e.g., 158) are considered as a data unit. Each Auxiliary Audit Trail (e.g., 158) has only a subset of the transactions that are committing, i.e., only the transactions that are committing on the particular Audit Trail. When a flush occurs, only a particular Auxiliary Audit Trail (e.g., 158) is flushed to the stable database (e.g., 86), making the flushing operation complete more quickly. In contrast, a Master Audit Trail (MAT) 170, FIG. 9, has all of the transaction "state" records, and only transaction "state" records. Typical entries in the Master Audit Trail 170 are shown in FIG. 9. Entries in the Master Audit Trail 170 include transaction "state" records 172 with values such as "committed", "aborted", "prepared", "forget", "committing", "aborting", and "pre-commit", as illustrated. When a flush occurs, a commit write is performed during which the transaction "state" records for all committed transactions are written to the Master Audit Trail 170.

In an alternative embodiment to that illustrated in FIG. 6, a Log Storage Group may include one Auxiliary Audit Trail, managed by Audit Process quad 145, 147, and data volumes managed by multiple Resource Manager process quads, e.g., quad 130 and 132, and other Resource Manager process quads not shown in FIG. 6.

The creation and employment of Log Storage Groups (e.g., 150*a–c*) helps to solve the problem that only a portion of the database data actually resides in the stable database 84. By maintaining the connection between a particular Auxiliary Audit Trail (e.g., 158) and the stable storage volumes (e.g., 152*a–b*) that log to the particular Audit Trail, a complete set of data is maintained in stable storage, including enough transaction state information to enable undo and redo operations. Thus, storage volumes that use a particular Auxiliary Audit Trail and that Audit Trail are considered to be an inseparable unit throughout the system, such that when a Log Storage Group is moved to another node, all data pertaining to the set of transactions, committed or flushed to the Auxiliary Audit, are present.

In the case where the transaction "state" records in the Auxiliary Audit Trail (e.g., 158) are not sufficient to determine the state of a transaction, the Master Audit Trail 170 is consulted. This can occur because the transaction state information that is logged for a distributed transaction depends on the position of the participant to a transaction in the spanning tree of the distributed transaction that accesses multiple nodes. For example, if the participant is a leaf in the spanning tree, that participant may not know the transaction state of the transaction after a failure has occurred. However, the correct transaction state is always available in the Master Audit Trail 170, which is accessible by any node in a cluster. In particular, a parent taking part in a distributed transaction records a "commit" record, a "committed" record and a "forget" record for a committed transaction. A child taking part in a distributed transaction records a "prepared" record and a "forget" record if the transaction is committed, and a node between a parent and a child records a "committed" record and a "forgotten" record. Additionally, whenever a child fails in the prepared state, the child node returns in the prepared state and has to resolve the transaction state as either committed or aborted according to the 2PC protocol. In a presumed abort protocol, if the child cannot resolve the transaction, it presumes that it is aborted. If the child asks the parent about the transaction, the parent must remember that the transaction was committed (if it was), until all of the children of the parent are notified. After all of the children in the transaction know the state of the transaction, the parent can then write a "forgotten" record and forget the transaction.

In accordance with one exemplary embodiment, it is advantageous that there be multiple Auxiliary Audit Trails (e.g., 158–160), perhaps as many as 30 to 50 Auxiliary Audit Trails for a node (e.g., 10). This allows for a multiplicity of Log Storage Groups (e.g., 150a–c) that can be distributed to the other nodes in a way that balances the load of the failed node somewhat evenly over the remaining nodes in the cluster. By this means the problem of handling the load of the inoperable or inaccessible node is addressed without seriously impacting the loads on the remaining nodes.

However, the distribution of multiple Log Storage Groups over the remaining nodes in a cluster may not be the complete solution to handling a node failure. The takeover of the inoperable or isolated node's load is done in a way that preserves database consistency, as described above.

Figure 10:
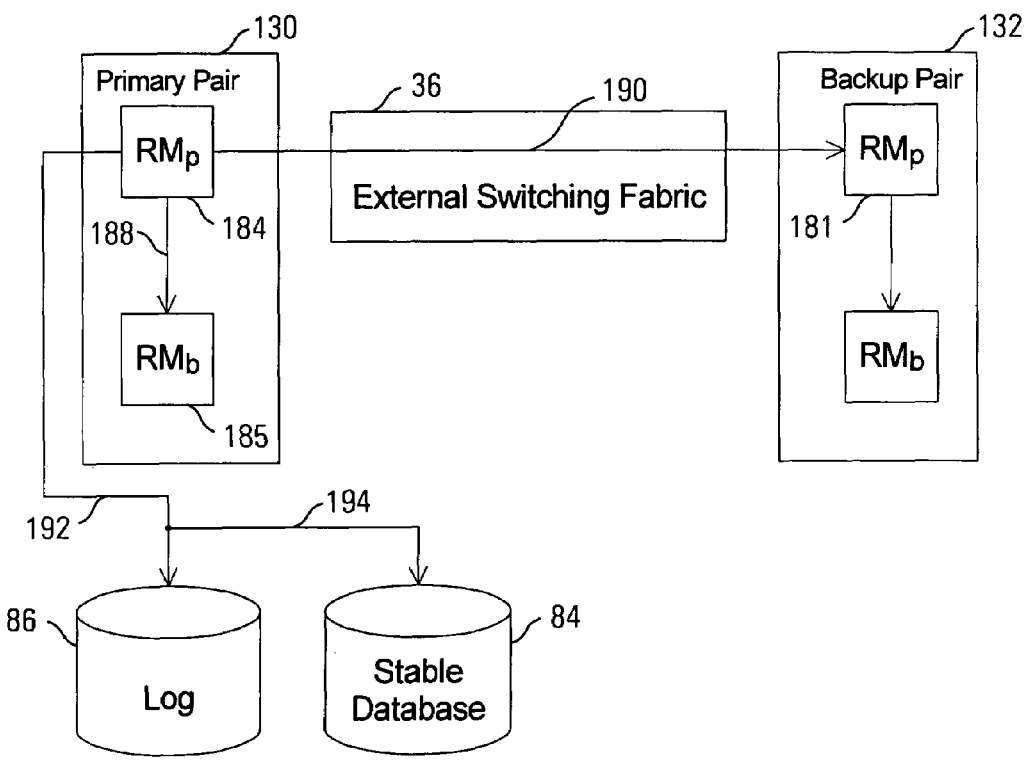
FIG. 10 is a block diagram illustrating an exemplary checkpointing process.

There are three cases to consider in regard to database consistency. The first case is one in which communications between the primary Resource Manager Process Pair 130 and the backup Resource Manager Process Pair 132 are operating normally without failure, as illustrated in FIG. 10. This means that the backup primary Resource Manager Process 181 has been receiving checkpoints 190 from the primary Resource Manager Process Pair 130 such that the backup Resource Manager Process Pair 132 has the primary Resource Manager Process Pair's 130 buffer cache. This ensures that, in the event of a failure of the primary Resource Manager Process Pair 130, normal transaction processing can continue with the backup Resource Manager Process Pair 132 now acting as the primary Resource Manager Process Pair. The checkpointing sequence that makes this possible is (a) checkpointing ahead (CAB) 188 from the primary Resource Manager Process 184 to the primary backup Resource Manager Process 185 in FIG. 10, (b) checkpointing ahead (CANB) 190 from the primary Resource Manager Process Pair 130 to the backup Resource Manager Process Pair 132 (over the network with a flag cp_flag in the Audit Trail that indicates communications are operational), (c) writing ahead to the log (WAL) 192, and then (d) writing to the storage volume (WDV) 194. In the CANB the audit buffer (which is periodically written to the log) is checkpointed 190 to the backup Resource Manager Process Pair 132 so that the backup Resource Manager Process Pair 132 forms a correct version of the Audit Trail from the audit buffer it receives. Also, because of the presence of an audit buffer, volume sequence numbers (VSNs) are used, as described above, for each of the cache blocks to help keep track of the progress of the audit buffer writes to the Auxiliary Audit Trail.

Figure 11:
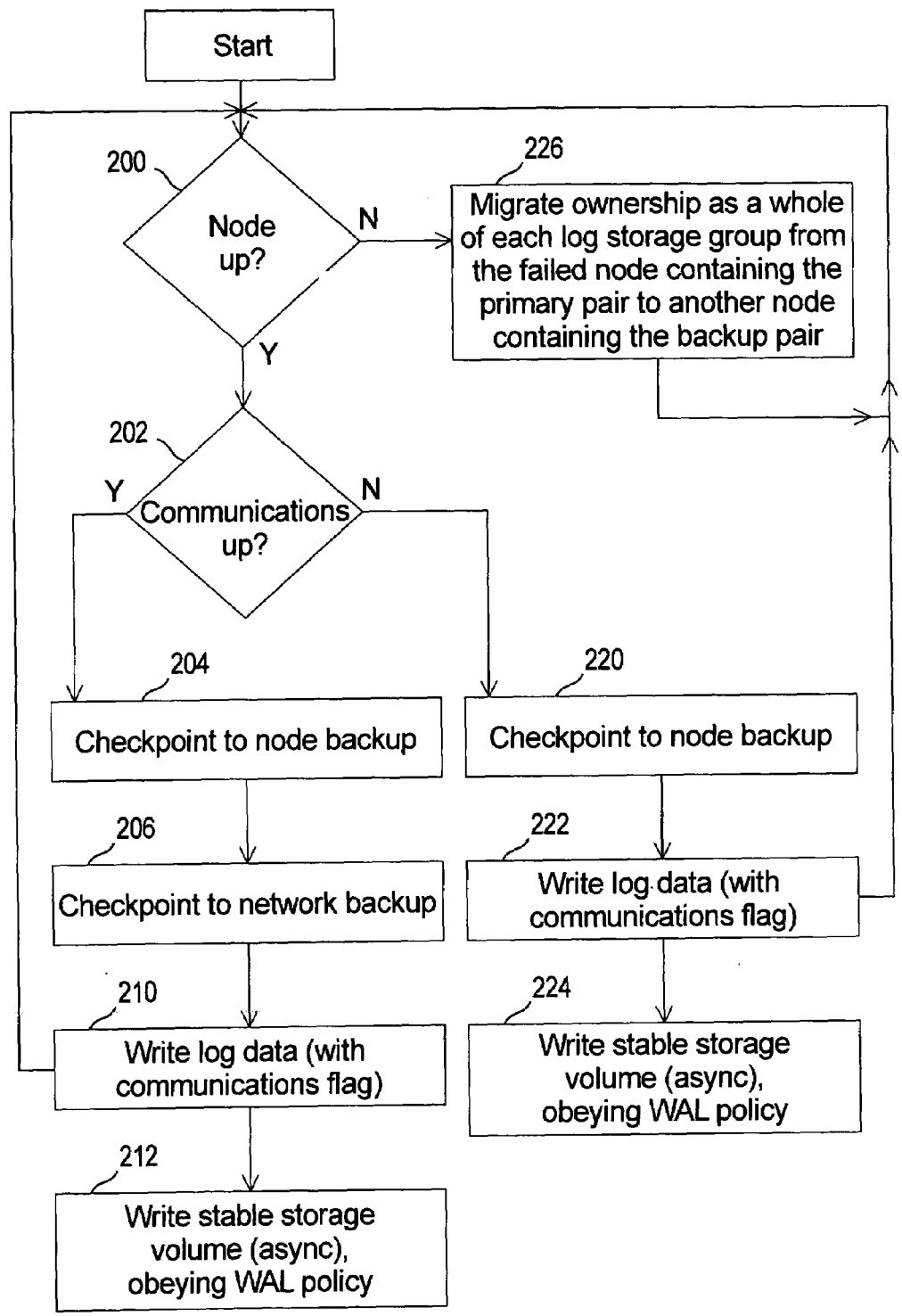
FIGS. 11–12 are flow charts of an exemplary checkpointing process and take-over process for a Resource Manager.

The flow chart in FIG. 11 illustrates the exemplary process from the Resource Manager point of view. If the node and communications are operational, as determined by tests 200, 202, then a "checkpoint" record is sent 204 to the node backup process and a "checkpoint" record is sent 206 to the network backup process. The Audit Trail for the volume involved is then written 210 and the communications flag is included. The stable database is written 212 asynchronously, i.e., whenever an update to stable storage is scheduled by the system.

This sequence (CAB, CANB, WAL, WDV) thus guarantees that the backup process pair can takeover for a particular storage volume in the failed node. As mentioned, the cp_flag is included in the CANB-part of the sequence to indicate the state of communications between the primary and backup nodes.

The second case to consider is one in which communications have failed between the primary Resource Manager Process Pair 130 and the backup Resource Manager Process Pair 132 but the nodes 10 and 14 containing them have not failed. (This may be visualized as in FIG. 10 with the checkpointing connection 190 broken). This case may result in one of two outcomes—first, communications may be restored, or second, communications may remain down until the takeover process is implemented. In the latter outcome, the backup Resource Manager Process Pair 132, upon takeover, may determine that the Auxiliary Audit Trail it has is not current, i.e., some checkpoints have been missed. However, the last good checkpoint is known because of the flag in the Audit Trail. Prior to the communications failure, the checkpointing sequence was CAB 188, CANB 190, WAL 192, WDV 194. However, subsequent to the communications failure, the checkpointing sequence changes to CAB 188, WAL 192, WDV 194. This guarantees that the Auxiliary Audit Trail for the primary process pair has current information in it. FIG. 11 illustrates the exemplary process, from the point of view of the Resource Managers. If communications are not operational as previously determined 202, a checkpoint is made 220 to the node backup (note that this checkpointing is local to the isolated node containing the primary Resource Manager Process Pair 130) and the Audit Trail is updated 222 including the communications flag. Stable storage is updated 224 asynchronously.

Figure 12:
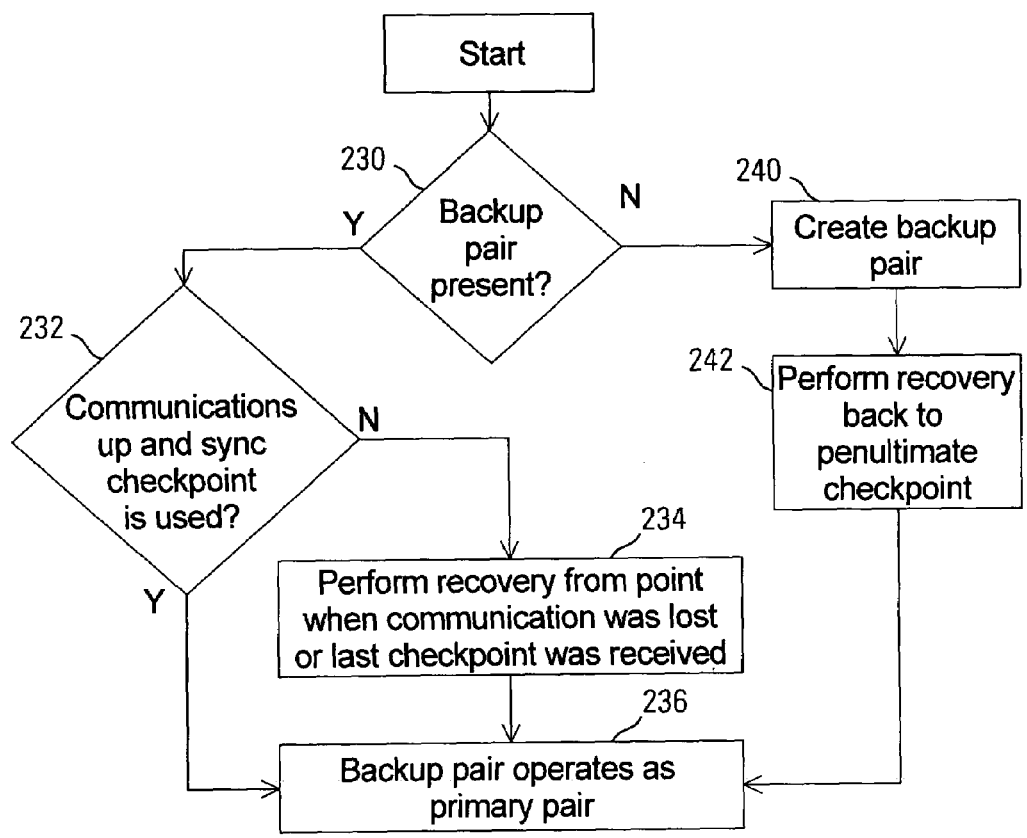

If communications are not restored, the isolated node containing the primary Resource Manager Process Pair 130 may be deemed to have failed and the takeover process is implemented, migrating ownership 226 of each log storage group, in parallel or one by one, of the failed node to the backup node(s). For example, ownership of the log storage group is moved from node 10 to node 14 and management is taken over by the backup Resource Manager Process Pair 132. (As will be discussed below with respect to FIG. 13, migration of a log storage group also includes moving control of the Audit Trail from the primary Audit Process Pair 145 in the failed node 10 to the backup Audit Process Pair 147 in the backup node 10. Because FIG. 11 shows the migration process from the point of view of the Resource Managers, and not the Audit Process Pairs, migration of the Audit Trail will be discussed below with respect to FIG. 13. However, log storage group migration does involve moving ownership and control of audit volumes (e.g., 86, FIG. 3) where the audit trail resides simultaneous with the data volumes (e.g., 84, FIG. 3) where the database resides.) Ownership of other log storage groups in the failed node are also migrated to backup nodes. For example, ownership and control of the log storage group associated with primary Audit Process Pair 139 and primary Resource Manager Process Pair 136 in the failed node 10 is move to is moved to backup Audit Process Pair 141 and backup Resource Manager Process Pair 138 in node 12. Log storage group ownership is moved as a whole to the node containing the backup Resource Manager Process Pair 132 using the process illustrated in FIG. 12. When a node failure occurs, the Auxiliary Audit Trail for the Log storage group is used to migrate control from the primary Resource Manager Process Pair 130 to the backup Resource Manager Process Pair 132, reconfiguring the database from the log. The backup node takes control of the Audit Trail through the Audit Process Pair 147, reads through the Audit Trail, and reconfigures the backup Resource Manager Process Pair 132 by performing a redo operation and undo operation based on the last good checkpoint and the updates in the Auxiliary Audit Trail for the Log Storage Group. Performing the redo and undo operations prepares the cache of the backup Resource Manager Process Pair 132 so that transaction processing can continue in a timely manner on the backup Resource Manager Process Pair 132. During the redo phase, locks may be reinstated to continue future transaction processing for providing better availability as described in "Minimum Latency Reinstatement of Database Transaction Duration Locks From the Log For Fast Crash Recovery of Databases", referred to and incorporated above. The exemplary process is illustrated in FIG. 12. If 230 the backup Resource Manager Process Pair 132 is present and if 232 communications are down, the recovery is performed 234 from the point in the Audit Trail when communications were operational, after which the backup Resource Manager Process Pair 132 operates 236 as the primary pair for the workload. In the case of a failure when the backup Resource Manager Process Pair 132 is present 230 and if 232 communications are up and synchronous, the backup Resource Manager Process Pair 132 may operate 236 as the primary pair for the workload without performing a recovery operation (e.g., 234) for the transaction.

The third case to consider is one in which there is no backup Resource Manager Process Pair (e.g., 132), as determined by test 230 in FIG. 12. In this case, a new Resource Manager Process Pair is created 240 on a server in an operating node and a complete recovery is performed 242, based on the Log Storage Group and the Master Audit Trail in the failed node. Reading the Audit Trail in the Log Storage Group, the server hosting the new process pair is setup with a cache state that is consistent with the Audit Trail, the cache being populated from the Audit Trail. Starting at the end, the Audit Trail is traversed backwards undoing all of the information that was sent to the cache until the point at which the transaction was begun is reached, thereby backing out active transactions. For transactions whose state is unclear in the Audit Trail, because the Audit Trail has only "pre-commit" records in it, the recovery procedure examines the Master Audit Trail to determine the state of the transaction in question. As described above, the Master Audit Trail is available for read-only access in Enterprise storage to any number of servers in the operational nodes.

A final case remains to be considered. This is the case in which the Audit Process fails. As described above, the process environment in the node includes an Audit Process Pair that performs the logging operation for the Resource Manager Pair, each process of which sends logging messages to a logging buffer managed by the Audit Process Pair. Referring to FIG. 6, the Audit Process Pair 139 has a backup Audit Process Pair 141 in a server of a node 12 separate from the node 10 hosting the primary Audit Process Pair 139, and checkpointing 140 occurs between the primary Audit Process Pair 139 and the backup Audit Process Pair 141.

Figure 13:
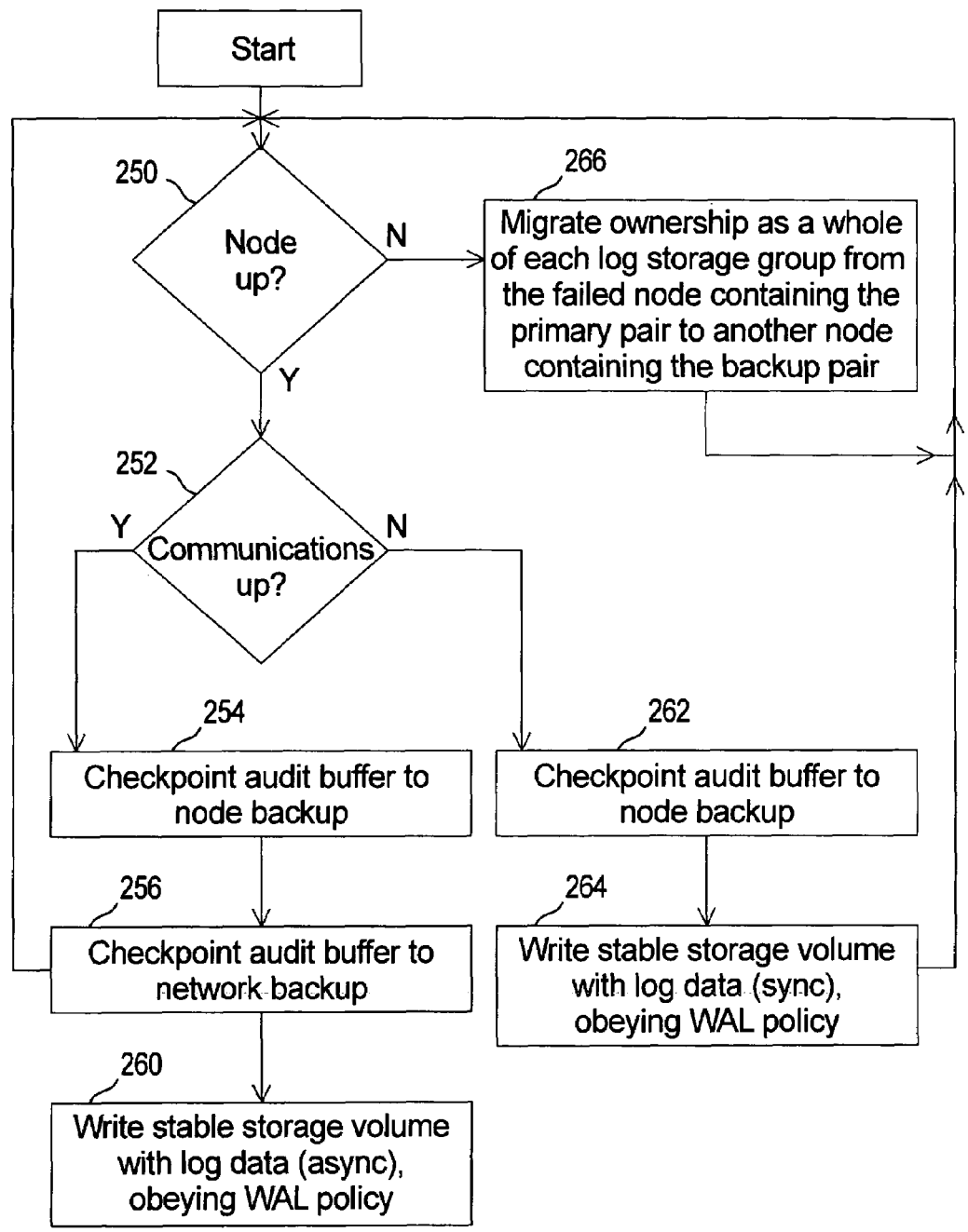
FIGS. 13–14 are flow charts of an exemplary checkpointing process and recovery process for an Audit Process.

Referring now to FIG. 13, under normal circumstances, with network communications between nodes (e.g., 10 and 12) operational and no node inoperability as determined by tests 250 and 252, the primary Audit Process Pair 139 performs 254 a Checkpoint Ahead to the Local Backup (CAB), a Checkpoint Ahead 140 to the Network Backup (CANB) 256, and a loop until the audit buffer is flushed to disk before replying that the flush is completed. However, in the same time, a double buffering technique may be used to fill in the incoming audit into another audit buffer. If 252 network communications between the primary Audit Process Pair 139 and the backup Audit Process Pair 141 are non-operational, then a flag is recorded in the Audit Trail. The flag indicates that the backup Audit Process Pair 141 checkpoints are not consistent with the primary Audit Process Pair 139 checkpoints. When this occurs, the primary Audit Process log buffer is checkpointed 262 to the backup process and the buffer is forced 264 to stable storage, on every update to the log buffer, essentially reverting to a write-through operation. This guarantees that the Audit Trail created by the primary Audit Process Pair is up to date. The sequence, when a failure occurs, is to Checkpoint Ahead to the local Backup Process (CAB) 262 and to perform 264 a write-through operation before replying that the flush is completed.

Figure 14:
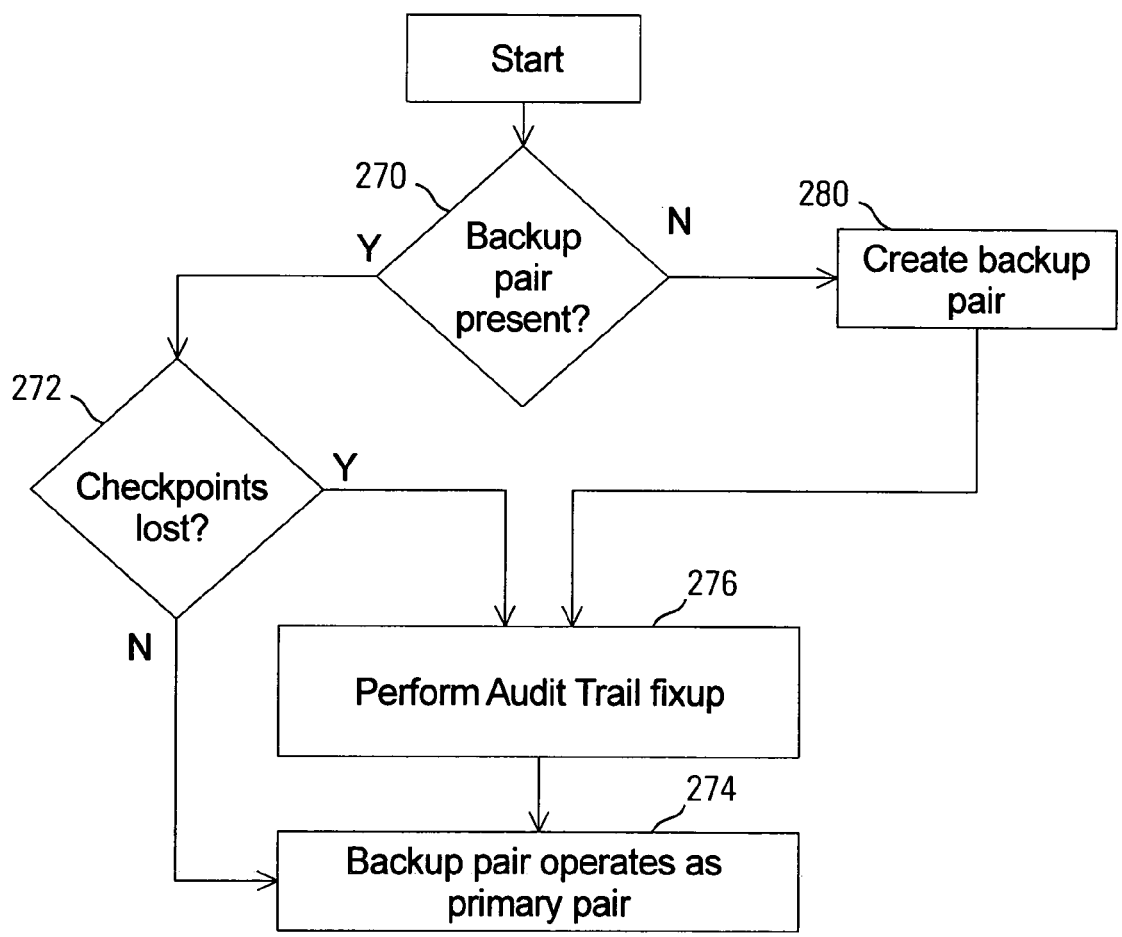

If communications are not restored, the recovery process for the Audit Process Pair is implemented, migrating ownership 266 of the log storage group from the failed Audit Process Pair 139 to the backup Audit Process Pair 141 (and of the associated Resource Managers as discussed above). In other words, the ownership of the log storage group migrates and the backup process pairs (both Resource Manager Process and Audit Process) take over, with the database being fixed up using the audit trail, and this happens for each log storage group in the failed node. Log storage group ownership is moved as a whole to the node 12 containing the backup Audit Process Pair 141 using the process illustrated in FIG. 14. The recovery process for the Audit Process Pair will follow path 276, that is, will fix up the audit trails either when the backup pair is not present or when some checkpoints are lost. If 270 the backup Audit Process Pair 141 is present and if 272 checkpoints are lost, an Audit Trail fixup is performed 276. If 270 the backup Audit Process Pair 141 is not present, a backup Audit Process Pair 141 is created 280 and the Audit Trail fixup is performed 276. The backup Audit Process Pair 141 may then operate 274 as the primary pair.

If the checkpointing is performed asynchronously, the backup process pair during takeover will need to perform recovery from the point where the last checkpoint was received. There is no performance penalty to performing an asynchronous checkpoint to the backup process pair; therefore, the backup process pair can speed up recovery during takeover without having performance degradation in the normal state.

In the case of a failure when the backup Audit Process Pair 141 is present 270 and no checkpoints are lost 272, the backup Audit Process Pair 141 may operate 274 as the primary pair without performing an Audit Trail fixup.

In summary, to handle the case of a node failure in a cluster without the need for a standby node, a plurality of Log Storage groups present on the failed node is distributed to other nodes in the cluster. Servers in the operating nodes receiving a Log Storage Group may perform a recovery procedure depending whether communications over the network between the operating node and the inoperable or inaccessible node were still operational at the time of failure. If communications were down, a partial recovery occurs back to the last known consistent checkpoint. If there were no backup process pairs on a node accepting the Log Storage Group, then process pairs are created and a full recovery procedure is performed. The result of the recovery procedure is that the caches of the node hosting the process pairs taking over are made consistent with the Audit Trail, so that transaction processing can continue without substantial delay. No attempt is made to flush all updates in the Audit Trail to the stable database, because this would lengthen the time for the system to takeover the inoperable or inaccessible node. In this way, a takeover of a failed node is possible without a complete standby node, by using the facilities of the other operational nodes in the cluster.

While illustrative embodiments have been described in detail herein, it is to be understood that the inventive concepts may be otherwise variously embodied and employed, and that the appended claims are intended to be construed to include such variations, except as limited by the prior art. In the claims, the term "a" is to be interpreted as meaning "one or more than one".

What is claimed is:

1. A method of transferring a transaction processing workload, the method comprising;
    establishing a plurality of primary process pairs on a first node in a cluster of nodes, each node including one or more servers and being associated with a plurality of stable storage volumes, the plurality of primary process pairs including a plurality of first primary processes and a plurality of first backup processes;
    grouping the plurality of stable storage volumes of the first node into a number of groups and assigning a separate audit trail to each group of stable storage volumes, each of the separate audit trails and their associated group of stable storage volumes forming a log storage group, the separate audit trail for each log storage group recording stable storage updates for the stable storage volumes in the log storage group;
    establishing a plurality of backup process pairs on a second node in the cluster, the plurality of backup process pairs including a plurality of second primary processes and a plurality of second backup processes;
    if the node on which the plurality of backup process pairs is established is in communication with the node hosting the plurality of primary process pairs, performing checkpointing operations via the network from the plurality of primary process pairs to the plurality of backup process pairs;
    performing checkpointing operations on the node hosting the plurality of primary process pairs;
    detecting a failure that makes the first node inoperable or inaccessible;
    after detecting the failure, engaging the plurality of backup process pairs as a new plurality of primary process pairs to perform the transaction processing workload of the plurality of primary process pairs in the failed node, the plurality of backup process pairs being configured to operate with a log storage group associated with the plurality of primary process pairs on the failed node.

2. A method of transferring a transaction processing workload as recited in claim 1, wherein prior to engaging the backup process pair, if the plurality of backup process pairs is not present, the method further comprises creating a plurality of backup process pairs on the second node.

3. A method of transferring a transaction processing workload as recited in claim 1,
    wherein the node that hosts the plurality of new primary process pairs has a cache for holding transaction data; and
    wherein the cache is loaded with transaction data derived from the audit trail to prepare the cache for operation with the plurality of new primary process pairs.

4. A method of transferring a transaction processing workload as recited in claim 1, wherein performing checkpointing operations on the node hosting the plurality of primary process pairs includes:
    checkpointing transaction updates from the plurality of first primary processes to the plurality of first backup processes;
    writing transaction updates and a communications flag to the audit trail, the communications flag indicating whether the node hosting the plurality of primary process pairs is in communication with the node on which the plurality of backup process pairs is established; and
    writing transaction updates to said plurality of stable storage volumes.

5. A method of transferring a transaction processing workload as recited in claim 1, wherein performing checkpointing operations from the plurality of primary process pairs to the plurality of backup process pairs includes:
    checkpointing transaction updates from the plurality of primary process pairs to the plurality of backup process pairs;
    writing transaction updates and a communications flag to the audit trail, the communications flag indicating whether the node hosting the plurality of primary process pairs is in communication with the node on which the plurality of backup process pairs is established; and
    writing transaction updates to said plurality of stable storage volumes.

6. A method of transferring a transaction processing workload as recited in claim 1,
    wherein the node hosting the plurality of primary process pairs includes a primary audit process pair that performs logging operations for the plurality of primary process pairs;
    wherein the node on which the plurality of backup process pairs is established has a backup audit process pair that performs logging operations for the plurality of backup process pairs after takeover; and
    further comprising checkpointing audit trail information from the primary audit process pair to the backup process pair.

7. A method of transferring a transaction processing workload as recited an claim 1,
    wherein the node hosting the plurality of primary process pairs includes a primary audit process pair that maintains a list of sequential updates in an audit trail for the plurality of primary process pairs;
    wherein the node on which the plurality of backup process pairs is established has a backup audit process pair that maintains a list of sequential updates in an audit trail for the plurality of backup process pairs;
    further comprising writing each update in the audit trail to a volume in the log storage group if the node on which the plurality of backup process pairs is established is out of communication with the node hosting the plurality of primary process pairs.

8. A method of transferring a transaction processing workload as recited in claim 1,
    wherein the node that hosts the plurality of new primary process pairs has a cache for holding transaction data;
    wherein, if, based on the communication flag in the audit trail, the node on which the plurality Df backup process pairs is established was out of communication with the node hosting the plurality of primary process pairs prior to the failure, said engaging the plurality of backup process pairs includes performing a recovery process based on data in the audit trail of the log storage group to prepare the cache for operation with the plurality of new primary process pairs.

9. A method of transferring a transaction processing workload as recited in claim 8,
wherein the node that hosts the plurality of new primary process pairs has a cache for holding transaction data; and
wherein performing a recovery procedure includes performing redo and undo operations based on updates in the audit trail of the log storage group to prepare the cache.

10. A method of transferring a transaction processing workload as recited in claim 9,
wherein the node that hosts the plurality of new primary process pairs has a cache for holding transaction data and the cache is operated according to a "steal, no force" policy; and
wherein the audit trail includes at least two checkpoints and the undo and redo operations, performed based on the updates in the audit trail, stop at the penultimate checkpoint.

11. A method of transferring a transaction processing workload as recited in claim 1,
wherein the node that hosts the plurality of new primary process pairs has a cache for holding transaction data; and
wherein, if the plurality of backup process pairs is not present, said engaging the plurality of backup process pairs includes performing a recovery process based on data in the audit trail of the log storage group to prepare the cache for operation with the plurality of new primary process pairs.

12. A method of transferring a transaction processing workload as recited in claim 11, wherein performing a recovery procedure includes performing redo and undo operations based on updates in the audit trail of the log storage group.

13. A method of transferring a transaction processing workload as recited in claim 12, wherein the node that hosts the plurality of new primary process pairs has a cache for holding transaction data and the cache is operated according to a "steal, no force" policy; and wherein the redo and undo operations, performed based on the updates in the audit trail in the log storage group, stop at the beginning of the audit trail.

14. A transaction processing apparatus, comprising:
a plurality of stable database storage volumes being organized into a plurality of stable storage volume groups;
a plurality of stable transaction log storage volumes, each log storage volume being associated with one of said stable storage volume groups to form a log storage group, each log storage volume having a separate audit trail to record stable storage updates for stable storage volumes in an associated stable storage volume group; and
a plurality of connected computing nodes, at least one node having a plurality of primary process pairs for performing work on behalf of a transaction by accessing the log storage group, wherein any of the stable storage volumes and log storage volumes are accessible by any of said computing nodes, and at least one other node having a plurality of backup process pairs for taking over the work of said plurality of primary process pairs by accessing the log storage group used by said plurality of primary process pairs, if said plurality of primary process pairs are non-operational.

15. A transaction processing apparatus as recited in claim 14, wherein the plurality of primary process pairs communicate checkpointing information to the plurality of backup process pairs.

16. A transaction processing apparatus as recited in claim 14,
wherein the computing node with the plurality of backup process pairs has a cache for holding transaction data; and
wherein the cache is loaded with transaction data derived from the log storage volume of the log storage group to prepare the cache for use by the plurality of backup process pairs when the plurality of backup pairs takes over the work of the plurality of primary process pairs.

17. A transaction processing apparatus as recited in claim 14,
wherein the computing node with the plurality of primary process pairs and the computing node with the plurality of backup process pairs each have a cache for holding transaction data, the cache in the computing node with the plurality of backup process pairs being maintained with substantially the same information as the cache in the computing node with the plurality of primary process pairs; and
wherein the cache in the computing node of the plurality of backup process pairs is used by the plurality of backup process pairs when the plurality of backup pairs takes over the work of the plurality of primary process pairs.

* * * * *

UNITED STATES PATENT AND TRADEMARK OFFICE
CERTIFICATE OF CORRECTION

PATENT NO. : 7,168,001 B2
APPLICATION NO. : 10/774267
DATED : January 23, 2007
INVENTOR(S) : Charles S. Johnson et al.

Page 1 of 1

It is certified that error appears in the above-identified patent and that said Letters Patent is hereby corrected as shown below:

In column 15, line 18, in Claim 1, delete "comprising;" and insert -- comprising: --, therefor.

In column 16, line 45, in Claim 7, delete "an" and insert -- in --, therefor.

In column 16, line 64, in Claim 8, delete "Df" and insert -- of --, therefor.

Signed and Sealed this

Twenty-eighth Day of July, 2009

JOHN DOLL
*Acting Director of the United States Patent and Trademark Office*